(12) United States Patent
Nung et al.

(10) Patent No.: US 10,367,887 B2
(45) Date of Patent: Jul. 30, 2019

(54) DATA STORAGE SYSTEM AND DATA STORAGE METHOD THEREOF

(71) Applicant: AccelStor, Inc., Taipei (TW)

(72) Inventors: Chih-Kang Nung, Taipei (TW); Pao-Chien Li, Taipei (TW); An-Nan Chang, Taipei (TW); Shih-Chiang Tsao, Taipei (TW)

(73) Assignee: ACCELSTOR LTD., Taipei (TW)

( * ) Notice: Subject to any disclaimer, the term of this patent is extended or adjusted under 35 U.S.C. 154(b) by 318 days.

(21) Appl. No.: 15/390,935

(22) Filed: Dec. 27, 2016

(65) Prior Publication Data

US 2018/0152512 A1    May 31, 2018

(30) Foreign Application Priority Data

Nov. 25, 2016  (CN) .......................... 2016 1 1058077

(51) Int. Cl.
*H04L 29/08* (2006.01)
*G06F 3/06* (2006.01)

(52) U.S. Cl.
CPC .......... *H04L 67/1097* (2013.01); *G06F 3/061* (2013.01); *G06F 3/065* (2013.01); *G06F 3/067* (2013.01); *G06F 3/0619* (2013.01); *G06F 3/0634* (2013.01); *G06F 3/0635* (2013.01)

(58) Field of Classification Search
CPC .......... H04L 41/12; H04L 43/08; H04L 67/12
See application file for complete search history.

(56) References Cited

U.S. PATENT DOCUMENTS

| 2005/0246572 | A1* | 11/2005 | Wilson | G06F 11/1441 |
| | | | | 714/6.12 |
| 2008/0072229 | A1* | 3/2008 | Kirton | G06F 9/5061 |
| | | | | 718/104 |
| 2010/0088485 | A1* | 4/2010 | Ikeda | G06F 3/0608 |
| | | | | 711/170 |
| 2011/0191639 | A1* | 8/2011 | Shinohara | G06F 11/0727 |
| | | | | 714/54 |
| 2011/0258407 | A1* | 10/2011 | Naganuma | G06F 3/0605 |
| | | | | 711/162 |
| 2013/0332692 | A1* | 12/2013 | Satoyama | G06F 3/0605 |
| | | | | 711/170 |
| 2016/0224441 | A1* | 8/2016 | Arnold | G06F 11/1662 |

* cited by examiner

*Primary Examiner* — Abdullahi E Salad
(74) *Attorney, Agent, or Firm* — McClure, Qualey & Rodack, LLP

(57) ABSTRACT

A data storage system and a data storage method thereof are provided. The data storage system includes a first server and a second server. The first server is connected to a transmission line, and the first server includes a first data pool and a first controller. The first controller is configured to operate in an active mode. In the active mode, the first controller receives to-be-stored data from a client, stores the to-be-stored data in the first data pool, and sends first storage data through the transmission line. The second server is connected to the first server, and the second server includes a second data pool and a second controller. The second controller is configured to operate in the active mode. In the active mode, the second controller receives the to-be-stored data through the transmission line, and the second controller stores the to-be-stored data in the second data pool.

27 Claims, 6 Drawing Sheets

DATA STORAGE SYSTEM AND DATA STORAGE METHOD THEREOF

CROSS-REFERENCE TO RELATED APPLICATION

This non-provisional application claims priority under 35 U.S.C. § 119(a) to Patent Application No. 201611058077.X filed in China, P.R.C. on Nov. 25, 2016, the entire contents of which are hereby incorporated by reference.

BACKGROUND

Technical Field

The present disclosure relates to a data storage system and a data storage method thereof.

Related Art

In the era of growing data storage demands, a variety of data storage architecture develop rapidly, and have found very wide applications such as cloud data storage, webmail, and online financial transaction systems.

However, in conventional data storage architecture, the data storage architecture only includes a single data pool, and such data storage architecture has a very high risk. For example, if the data pool is damaged, all client computers that are connected to the same data pool cannot access the data pool. If all data stored in the data pool disappear because the data pool is damaged, a severe loss is caused. Moreover, after the data pool is damaged and before the data pool is repaired, a client computer also cannot store new data in the data pool, resulting in inconvenience in use of the client computer.

SUMMARY

In view of this, the present invention proposes a data storage system and a data storage method thereof.

In an embodiment, a data storage system includes a first server and a second server. The first server is connected to a first transmission line, and the first server includes a first data pool and a first controller. The first controller is configured to operate in an active mode. In the active mode, the first controller receives to-be-stored data from a client, stores the to-be-stored data in the first data pool, and sends first storage data through the first transmission line. The second server is connected to the first server through the first transmission line, and the second server includes a second data pool and a second controller. The second controller is configured to operate in the active mode. In the active mode, the second controller receives the to-be-stored data through the first transmission line, and the second controller stores the to-be-stored data in the second data pool.

In another embodiment, a data storage method includes: receiving multiple pieces of to-be-stored data from at least one client by using a first controller of a first server, storing the pieces of to-be-stored data in a first data pool of the first server, transferring the pieces of to-be-stored data from the first server to a second server through a transmission line, and storing the pieces of to-be-stored data in a second data pool of the second server through a second controller of the second server.

In conclusion, for the embodiments of the data storage system and the data storage method according to the present invention, the data storage system includes two independent data pools, and each controller may operate in a rejection mode, so that to-be-stored data that is sent by a client when a link of a transmission line is interrupted can be stored in either of the two data pools, to prevent same data from being divided into different data segments to be respectively stored in different data pools.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
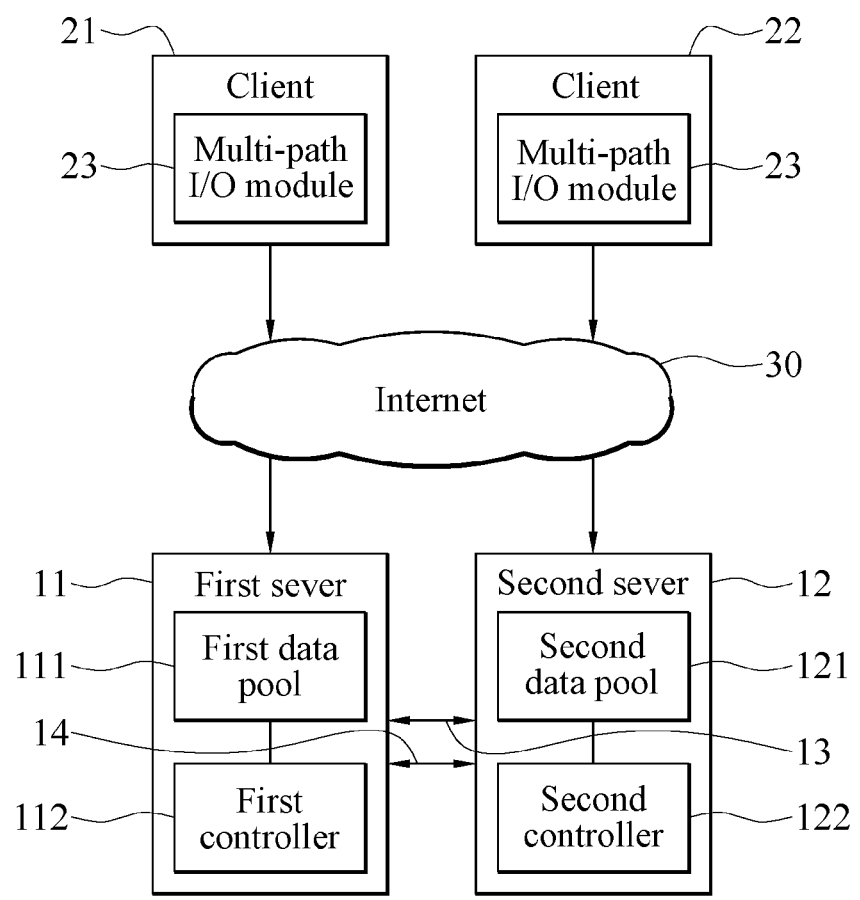
FIG. 1 is a schematic block diagram of an embodiment of a data storage system according to the present invention.
Figure 2:
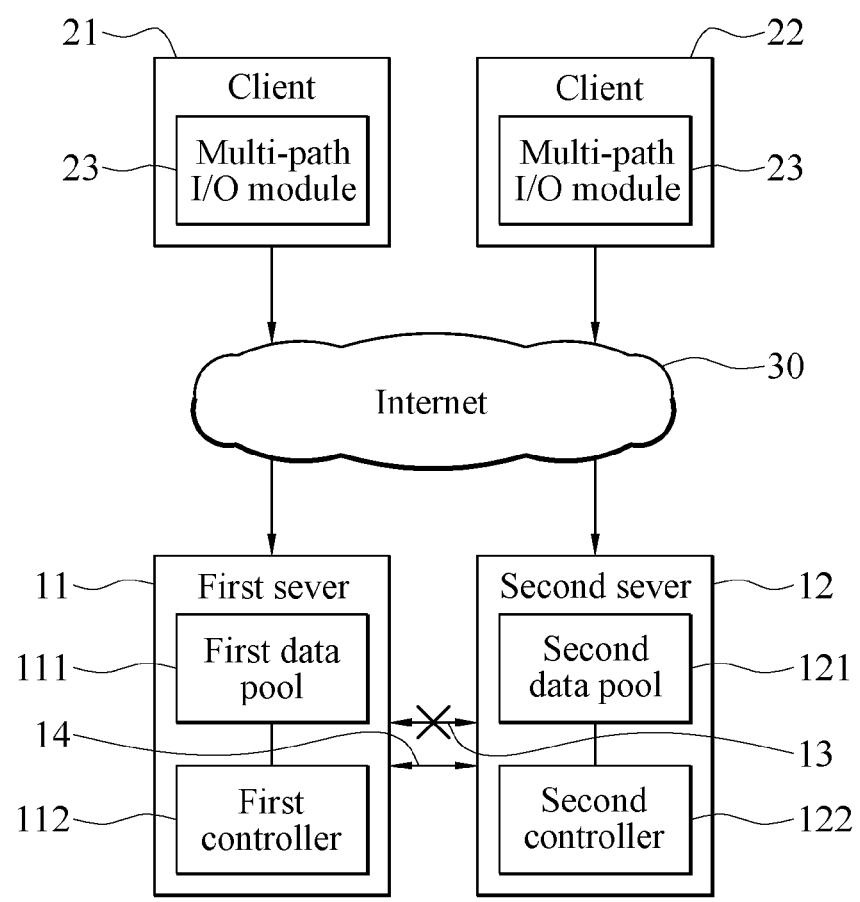
FIG. 2 is a schematic block diagram of an implementation aspect when a link of a first transmission line of the data storage system in FIG. 1 is interrupted.
Figure 3:
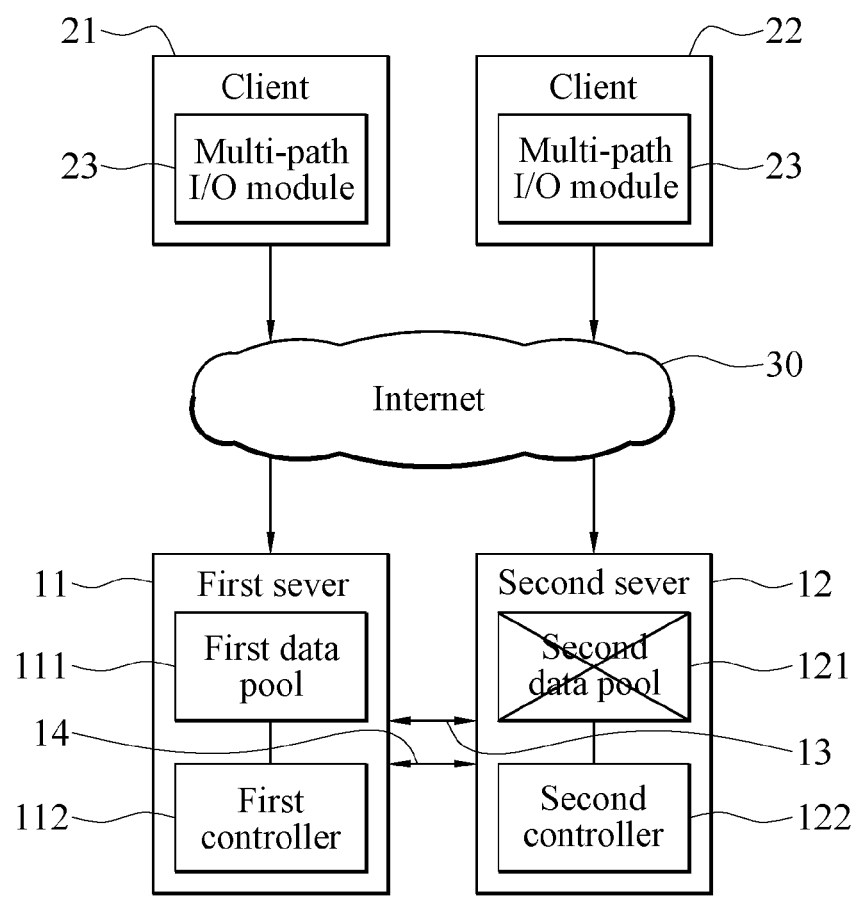
FIG. 3 is a schematic block diagram of an implementation aspect when a second data pool of the data storage system in FIG. 1 is damaged.

FIG. 1 is a schematic block diagram of an embodiment of a data storage system according to the present invention. FIG. 2 is a schematic block diagram of an implementation aspect when a link of a first transmission line of the data storage system in FIG. 1 is interrupted. FIG. 3 is a schematic block diagram of an implementation aspect when a second data pool of the data storage system in FIG. 1 is damaged. Here, in FIG. 1 to FIG. 3, two clients 21, 22 are used as an example. However, the present invention is not limited thereto, and a quantity of clients may be greater than 2. Referring to FIG. 1 to FIG. 3, the data storage system is connected to the clients 21, 22, and the data storage system may be connected to the clients 21, 22 through an Internet network 30, so as to execute write requests and read requests that are sent by the clients 21, 22. The data storage system includes two servers (for ease of description, the two servers are respectively referred to as a first server 11 and a second server 12). The first server 11 is connected to the second server 12 through a first transmission line 13 and a second transmission line 14. The first server 11 includes a first data pool 111 and a first controller 112, and the first controller 112 is connected to the first data pool 111. The second server 12 includes a second data pool 121 and a second controller 122, and the second controller 122 is connected to the second data pool 121. In some implementation aspects, the first transmission line 13 may be InfiniBand or a fiber channel that conforms to a high-speed bus standard. The first server 11 and the second server 12 may perform high-speed data transmission, for example, data transmission at a speed of 40 Gb/s, through the first transmission line 13. The second transmission line 14 may be a network line that is not a high-speed data transmission line. The first server 11 and the second server 12 may communicate with each other through the second transmission line 14.

In some implementation aspects, one of the two clients 21, 22 may include a multi-path I/O (MPIO) module 23, to determine to transfer to-be-stored data to the first server 11 or the second server 12 to store the to-be-stored data in either of the two data pools 111, 121. For example, if the write request sent by the client 21 includes address information of the first server 11, it represents that the MPIO module 23 of the client 21 intends to store the to-be-stored data in the first data pool 111. After the client 21 sends the write request, if the first server 11 does not respond to the write request sent by the client 21, for example, if the to-be-stored data cannot be written because the first server 11 is not powered on or the first data pool 111 is damaged, in this case, the client 21 resends the write request that includes the address information of the second server 12, to enable the to-be-stored data to be stored in the second data pool 121.

The first controller 112 and the second controller 122 may respectively have three operation modes: an active mode, an alone mode, and a rejection mode. In an initial state, if links of the first transmission line 13 and the second transmission line 14 are both normal, the first controller 112 may communicate with the second controller 122 through the second transmission line 14 to detect that a link status of the first transmission line 13 is normal, so that the first controller 112 operates in the active mode. Similarly, the second controller 122 may also communicate with the first controller 112 through the second transmission line 14 to detect that the link status of the first transmission line 13 is normal, so that the second controller 122 operates in the active mode. In the active mode, assuming that either of the two clients 21, 22 sends the to-be-stored data (referred to as first storage data below) to the first server 11, the first controller 112 receives the first storage data, the first controller 112 stores the first storage data in the first data pool 111, and the first controller 112 forwards the first storage data, so that the first storage data is sent to the second server 12 through the first transmission line 13. In this case, the second controller 122 receives the first storage data through the first transmission line 13, and stores the first storage data in the second data pool 121, so that the first storage data may be synchronously stored in the first data pool 111 and the second data pool 121.

In another aspect, in the active mode, assuming that either of the clients 21, 22 sends the to-be-stored data (referred to as second storage data below) to the second server 12, the second controller 122 receives the second storage data, the second controller 122 stores the second storage data in the second data pool 121, and the second controller 122 forwards the second storage data, so that the second storage data is sent to the first server 11 through the first transmission line 13. In this case, the first controller 112 receives the first storage data through the first transmission line 13, and stores the first storage data in the first data pool 111, so that the second storage data may be synchronously stored in the first data pool 111 and the second data pool 121.

Based on this, regardless of whether the clients 21, 22 sends the to-be-stored data to the first server 11 or the second server 12, each piece of to-be-stored data from the clients 21, 22 may be synchronously stored in the first data pool 111 and the second data pool 121. In this case, after either of the clients 21, 22 sends a read request, the first server 11 may output data in the first data pool 111 or the second server 12 may output data in the second data pool 121 to respond to the read request sent by the clients 21, 22.

In some implementation aspects, as shown in FIG. 2, when the link of the first transmission line 13 is interrupted, resulting in that the first server 11 and the second server 12 cannot perform data transmission through the first transmission line 13, for example, when the first transmission line 13 is damaged, or a connection between the first transmission line 13 and either of the first server 11 and the second server 12 is interrupted, the to-be-stored data from the clients 21, 22 cannot be synchronously stored in the second server 12 and the first server 11. When the link of the first transmission line 13 is interrupted, the first controller 112 and the second controller 122 may detect, through the second transmission line 14, that the first transmission line 13 cannot work. In this case, the first controller 112 is switched from the active mode to the alone mode, and the second controller 122 is switched from the active mode to the rejection mode.

When the second controller 122 operates in the rejection mode, the second controller 122 does not receive the to-be-stored data transferred by all clients (the clients 21, 22). For example, the client 22 transfers third storage data to the second server 12. In this case, the second controller 122 does not receive the third storage data. In this case, the MPIO module 23 of the client 22 then sends the third storage data to the first server 11. In the alone mode, the first controller 112 receives the to-be-stored data, that is, the third storage data, sent by each client. The first controller 112 stores the third storage data in the first data pool 111. In addition, not only that the first controller 112 stores the third storage data in the first data pool 111, but also in the alone mode, the first controller 112 does not send the third storage data. Based on this, when the first controller 112 operates in the alone mode and the second controller 122 operates in the rejection mode, regardless of whether the clients 21, 22 originally send the to-be-stored data to the first server 11 or the second server 12, as a result of that the first controller 112 operates in the alone mode and the second controller 122 operates in the rejection mode, each piece of to-be-stored data sent by the clients 21, 22 is eventually stored in the first data pool 111.

After the first transmission line 13 is repaired (that is, the first transmission line 13 may be normally connected to the first server 11 and the second server 12), in still the foregoing example in which the first controller 112 operates in the alone mode and the second controller 122 operates in the rejection mode, the first controller 112 is switched from the alone mode to the active mode. After the first controller 112 is switched to the active mode, the first controller 112 receives the to-be-stored data (referred to as fourth storage data below) sent by either of the clients 21, 22 after the first transmission line 13 is repaired, and stores the fourth storage data in the first data pool 111. Moreover, the first controller 112 forwards the fourth storage data, and the fourth storage data is transferred to the second server 12 through the first transmission line 13. In this case, the second controller 122 operates in the rejection mode, the second controller 122 does not receive the to-be-stored data sent by the clients 21, 22, the second controller 122 receives the fourth storage data through the first transmission line 13, and stores the fourth storage data in the second data pool 121, so that the fourth storage data may be synchronously stored in the first data pool 111 and the second data pool 121.

Moreover, after the first controller 112 is switched from the alone mode to the active mode, the first controller 112 also sends the to-be-stored data, that is, the third storage data, received in the alone mode. The first controller 112 may control the first data pool 111 to output the third storage data, so that the third storage data is transferred to the second server 12 through the first transmission line 13. In this case, in the rejection mode, the second controller 122 receives the third storage data through the first transmission line 13, and writes the third storage data in the second data pool 121. After the third storage data is updated in the second data pool 121, the second controller 122 is switched from the rejection mode to the active mode. In some implementation aspects, the second controller 122 may communicate with the first controller 112 through the second transmission line 14 to learn that the first controller 112 has sent, through the first transmission line 13, each of multiple pieces of to-be-stored data that are stored in the alone mode, and the second controller 122 is further switched from the rejection mode to the active mode.

In some implementation aspects, as shown in FIG. 3, if one of the two data pools 111, 121 is damaged, for example, if the second data pool 121 has a damaged track, or if a connection between the second data pool 121 and the second controller 122 is interrupted, in this case, the to-be-stored data from the clients 21, 22 cannot be stored in the second data pool 121. In this case, the first controller 112 may detect, through the second transmission line 14, that the second data pool 121 is damaged, and the first controller 112 is switched from the active mode to the alone mode. After detecting that the second data pool 121 is damaged, the second controller 122 is switched from the active mode to the rejection mode. Here, regardless of whether the clients 21, 22 originally send the to-be-stored data to the first server 11 or the second server 12, the first controller 112 operates in the alone mode and the second controller 122 operates in the rejection mode, resulting in that each piece of to-be-stored data sent by the clients 21, 22 is eventually stored in the first data pool 111. After the second data pool 121 is repaired, the first controller 112 is switched from the alone mode to the active mode, so that each piece of to-be-stored data sent by the clients 21, 22 after the second data pool 121 is repaired may be synchronously stored in the first data pool 111 and the second data pool 121, and each piece of to-be-stored data sent by the clients 21, 22 during a period in which the second data pool 121 is damaged may be synchronously stored in the second data pool 121. After each piece of to-be-stored data stored in the first data pool 111 during the period in which the second data pool 121 is damaged is synchronized and updated in the second data pool 121, the second controller 122 is switched from the rejection mode to the active mode.

Figure 4:
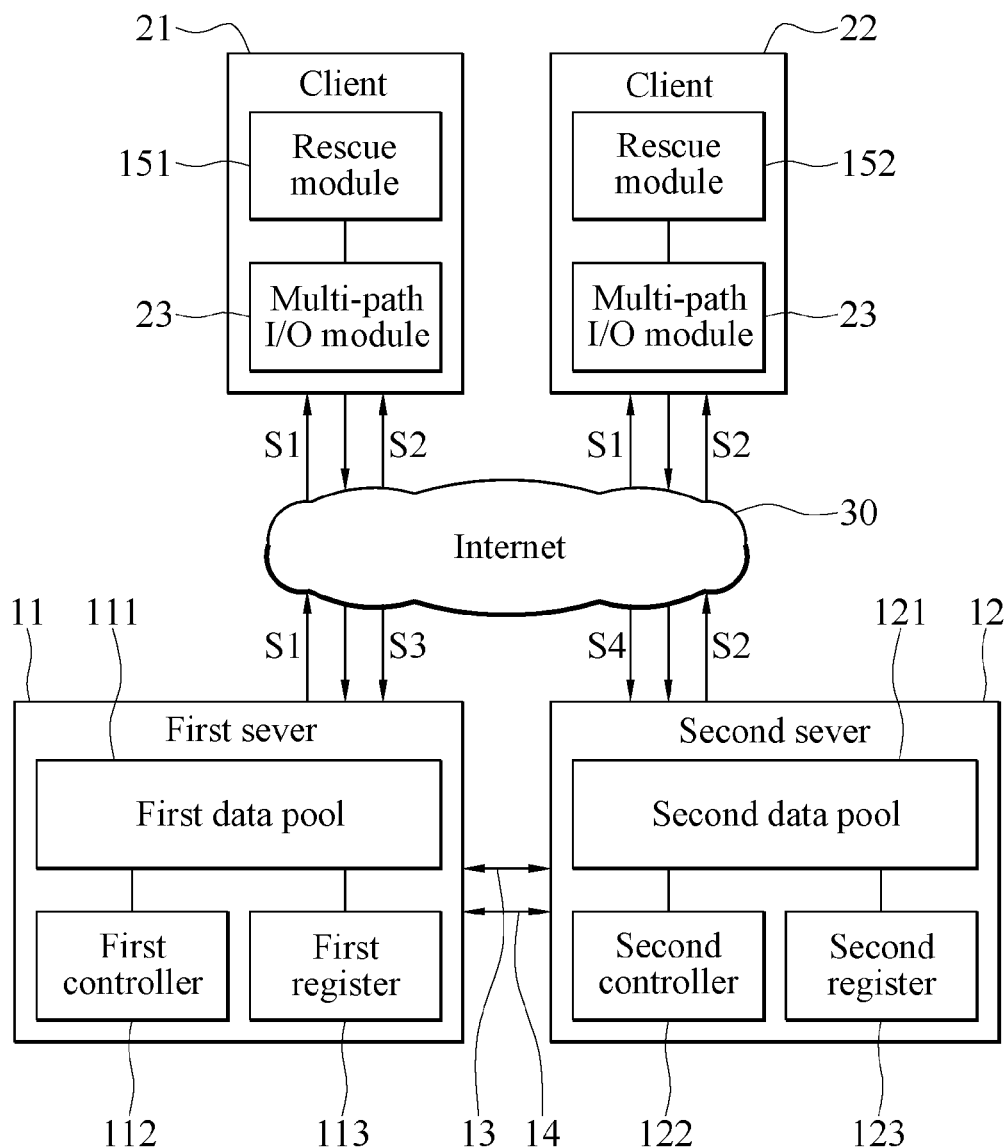
FIG. 4 is a schematic block diagram of an implementation aspect when a client of the data storage system in FIG. 1 includes a rescue module.
Figure 5:
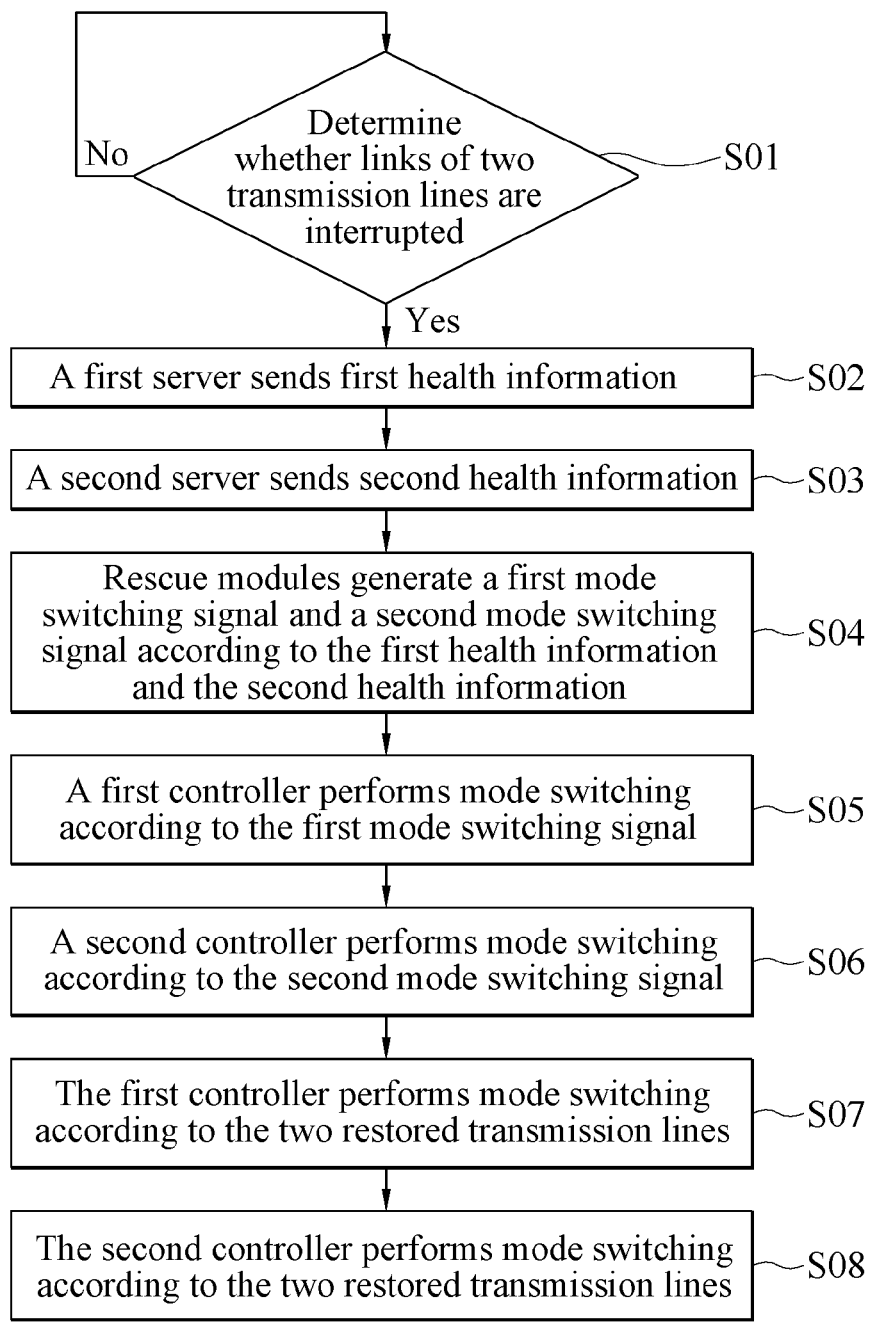
FIG. 5 is a flowchart of an implementation aspect of the data storage system in FIG. 4.

FIG. 4 is a schematic block diagram of another implementation aspect of the data storage system in FIG. 1. FIG. 5 is a flowchart of an implementation aspect of the data storage system in FIG. 4. Referring to both FIG. 4 and FIG. 5, the data storage system further includes at least one rescue module (rescue modules 151, 152), disposed in each of the clients 21, 22. When the two transmission lines 13, 14 are both damaged, resulting in that the two transmission lines 13, 14 cannot work, in this case, the rescue modules 151, 152 need to be used to determine operation modes of the controllers 112, 122. In particular, in the active mode, the two controllers 112, 122 determine whether the links of the two transmission lines 13, 14 are interrupted (Step S01). If a determining result of the two controllers 112, 122 is "yes", the first server 11 sends health information (first health information S1) of the first data pool 111 (Step S02). The second server 12 sends health information (second health information S2) of the second data pool 121 (Step S03), so that the two rescue modules 151, 152 respectively receive the health information S1, S2 of the two data pools 111, 121. In this case, the two rescue modules 151, 152 generate a first mode switching signal S3 and a second mode switching signal S4 according to the first health information S1 and the second health information S2, respectively (Step S04), resulting in that the first controller 112 performs mode switching according to the first mode switching signal S3 (Step S05), and the second controller performs mode switching according to the second mode switching signal S4 (Step S06).

Specifically, in Steps S05 and S06, the two rescue modules 151, 152 respectively compare the first health information S1 and the second health information S2, so as to determine whether the first health information S1 or the second health information S2 is better. The rescue modules 151, 152 send a mode switching signal to the first server 11 and the second server 12 respectively according to the first health information S1 and the second health information S2 within a preset waiting time of the first controller 112 and a preset waiting time of the second controller 122, so that the controller of the server having better health information is switched to the alone mode, and the controller of the server having worse health information is switched to the rejection mode. For example, assuming that the health information of the first data pool 111 is better, either of the two rescue modules 151, 152 sends the first mode switching signal S3 to the first server 11, and either of the two rescue modules 151, 152 sends the second mode switching signal S4 to the second server 12. The first controller 112 is switched from the active mode to the alone mode according to the first mode switching signal S3, and the second controller 122 is switched from the active mode to the rejection mode according to the second mode switching signal S4.

It should be noted that, the first mode switching signal S3 and the second mode switching signal S4 that are generated by the two rescue modules 151, 152 are the same. If the first controller 112 first receives the first mode switching signal S3 from the rescue module 151 and then receives the first mode switching signal S3 from the rescue module 152, the first controller 112 performs mode switching according to the first mode switching signal S3 from the rescue module 151 and ignores the subsequently received first mode switching signal S3. Similarly, the second controller also ignores the subsequently received second mode switching signal S4, Here no longer elaborate. Moreover, before receiving the health information S1, S2, the two rescue modules 151, 152 first register the Internet Protocol (IP) of the two rescue modules 151, 152 with the two servers 11, 12 respectively, so as to perform verification procedure.

Further, in some implementation aspects, if one of the two servers 11, 12 is powered off, for example, if the second server 12 is powered off, the first server 11 cannot be connected to the second server 12 through the two transmission lines 13, 14. In this case, the first controller 112 also waits for a mode switching signal sent by either of the rescue modules 151, 152 to perform mode switching. However, because the second server 12 is in a powered-off state and does not send the second health information S2, the rescue modules 151, 152 cannot generate the mode switching signal within the foregoing preset waiting time according to the first health information S1 and the second health information S2. In this case, after the first controller 112 detects that the two transmission lines 13, 14 cannot work, if the first controller 112 does not receive a mode switching signal within the preset waiting time, the first controller 112 is switched from the active mode to the alone mode.

Based on this, in the foregoing cases in which the two transmission lines 13, 14 are damaged and the second server 12 is powered off, regardless of whether the clients 21, 22 originally send the to-be-stored data to the first server 11 or the second server 12, as a result of that the first controller 112 operates in the alone mode and the second controller 122 operates in the rejection mode, each piece of to-be-stored data sent by the clients 21, 22 is eventually stored in the first data pool 111.

After Step S06, if the links of the two transmission lines 13, 14 are restored, for example, if the two transmission lines 13, 14 are repaired or the second server 12 enters a powered-on state, the first controller 112 and the second controller 122 respectively perform mode switching (Steps S07 and S08). Specifically, in Step S07, the first controller 112 is switched from the alone mode to the active mode, so that the to-be-stored data sent by the clients 21, 22 after the two transmission lines 13, 14 are restored may be simultaneously stored in the first data pool 111 and the second data pool 121, and the first controller may update, in the second data pool 121 through the first transmission line 13, the to-be-stored data sent by the clients 21, 22 during a period in which the two transmission lines 13, 14 cannot work (referred to as a update procedure below). After the update procedure ends, the second controller 122 is switched from the rejection mode to the active mode (Step S08).

Figure 6:
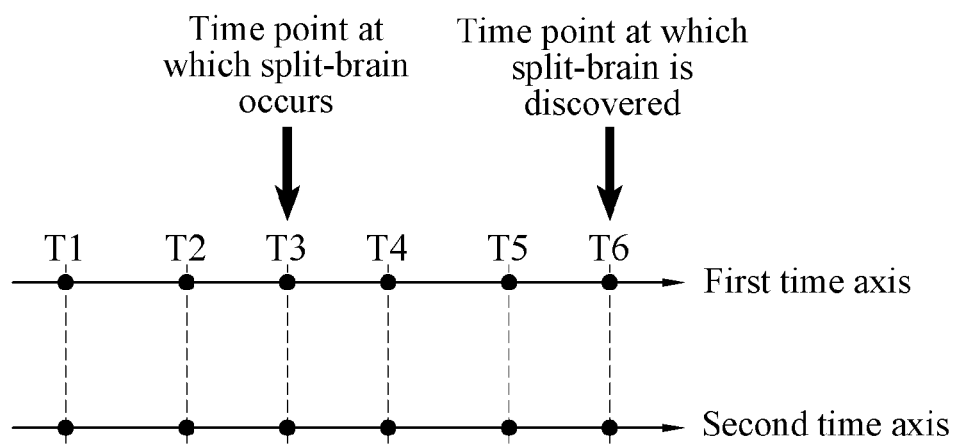
FIG. 6 is a schematic diagram of an implementation aspect of a time axis when a first server and a second server of the data storage system in FIG. 1 operate.

FIG. 6 is a schematic diagram of an implementation aspect of a time axis when the first server 11 and the second server 12 of the data storage system in FIG. 1 operate. A first time axis represents a time axis that exists when the first server 11 operates, and a second time axis represents a time axis that exists when the second server 12 operates. In other implementation aspects, referring to FIG. 6, the to-be-stored data sent by the clients 21, 22 is divided into multiple data segments after a time point T3 and the multiple data segments are respectively stored in the first data pool 111 and the second data pool 121 (or referred to as a split-brain condition). For example, if the links of the two transmission lines 13, 14 are interrupted at the time point T3, resulting in that the first controller 112 and the second controller 122 both operate in the alone mode, two data segments of a same piece of storage data are respectively stored in the first controller 112 and the second controller 122. In this case, when the data storage system responds to the read requests of the clients 21, 22, the data storage system respectively outputs the two data segments and cannot correctly respond to the read requests of the clients 21, 22. Based on this, the first server 11 and the second server 12 may repeatedly capture snapshots of the first data pool 111 and the second data pool 121 before the to-be-stored data is divided into two data segments (that is, the time points T1, T2), so that a user of the data storage system may select to restore data stored in the first data pool 111 and the second data pool 121 to a data state at the time point T1 or the time point T2 before the time point T3.

Further, the first server 11 further includes a first register 113 connected to the first controller 112, and the second server 12 further includes a second register 123 connected to the second controller 122. When the links of the two transmission lines 13, 14 are interrupted at the time point T3, the first controller 112 and the second controller 122 sequentially store, in the alone mode, the data segments of the to-be-stored data transmitted by the clients 21, 22 after the time point T3 respectively in the first register 113 and the second register 123. Moreover, the first controller 112 and the second controller 122 may further respectively capture snapshots of the first data pool 111 and the second data pool 121 (the snapshots of the first data pool 111 and the second data pool 121 are respectively referred to as a first snapshot and a second snapshot below) at the time point T3 when the split-brain condition occurs, and the first controller 112 and the second controller 122 respectively record a status of the first register 113 (referred to as a first status below) and a status of the second register 123 (referred to as a second status below) at a same time point, for example, a time point T4, T5, T6, so as to respectively establish data restoration points at the time point T4, T5, T6 according to the first snapshot, the second snapshot, and the first status and the second status recorded at a same time point. If the user finds that the foregoing split-brain condition at the time point T6, the user may select to restore data in the first data pool 111 and the second data pool 121 to data at any of the time points T4, T5, T6 after the time point T3. In other words, after the two transmission lines 13, 14 are restored, the first server 11 and the second server 12 may restore a state of data in the first data pool 111 and the second data pool 121 to a designated data restoration point according to the foregoing multiple data restoration points.

Specifically, in an embodiment, a data segment of each piece of to-be-stored data from the clients 21, 22 has a sequence number, and sequence numbers of the data segments are arranged in a sending order of the data segments. For example, if the clients 21, 22 sequentially send a first data segment and a second data segment of fifth storage data of the to-be-stored data to the first server 11 and the second server 12 in a period after the time point T3 and before the time point T4, and the clients 21, 22 sequentially send the second data segment and the first data segment of sixth storage data of the to-be-stored data to the first server 11 and the second server 12 in a period after the time point T4 and before the time point T5. In this case, sequence numbers of the first data segment and the second data segment of the fifth storage data and the second data segment and the first data segment of the sixth storage data may be "1", "3", "2", and "4", respectively. The first controller 112 sequentially stores, in the first register 113, the first data segment of the fifth storage data and the sequence number "1" of the first data segment of the fifth storage data and the first data segment of the sixth storage data and the sequence number "4" of the first data segment of the sixth storage data. The second controller 122 sequentially stores, in the second register 123, the second data segment of the fifth storage data and the sequence number "3" of the second data segment of the fifth storage data and the second data segment of the sixth storage data and the sequence number "2" of the second data segment of the sixth storage data. Moreover, the first controller 112 records the first status of the first register 113 at the time point T4, and the first controller 112 records the first status of the first register 113 at the time point T5. The second controller 122 records the second status of the second register 123 at the time point T4, and the second controller 122 records the second status of the second register 123 at the time point T5.

During restoration of data, if the user selects to restore data to the time point T4, in this case, the first controller 112 and the second controller 122 may perform comparison and sorting on the sequence numbers "1" and "3" according to the first status of the first register 113 and the second status of the second register 123 at the time point T4, so as to combine the first data segment and the second data segment of the fifth storage data, and eventually, the fifth storage data obtained after combination (including the first data segment and the second data segment that are combined) is respectively stored in the first data pool 111 and the second data pool 121 according to the first snapshot and the second snapshot. Similarly, if the user selects to restore data to the time point T5, the first controller 112 and the second controller 122 may respectively perform comparison and sorting on the sequence numbers "1" and "3" and the sequence numbers "2" and "4" respectively according to the first status of the first register 113 and the second status of the second register 123 at the time point T5, so as to combine the first data segment and the second data segment of the fifth storage data, and combine the first data segment and the second data segment of the sixth storage data. Eventually, the fifth storage data and the sixth storage data that are obtained after combination are then respectively updated in the first data pool 111 and the second data pool 121 according to the first snapshot and the second snapshot.

Further, if either of the first register 113 and the second register 123 has insufficient storage space, in this case, the first controller 112 and the second controller 122 respectively record the first status of the first register 113 and the second status of the second register 123, and move data stored in the first register 113 and the second register 123 to another storage unit. Here, the first controller 112 and the second controller 122 may respectively clear the first register 113 and the second register 123 to store another data segment.

In conclusion, for the embodiments of the data storage system and the data storage method according to the present invention, the data storage system includes two independent data pools, and each controller may operate in a rejection mode, so that to-be-stored data that is sent by a client when a link of a transmission line is interrupted can be stored in either of the two data pools, to prevent same data from being divided into different data segments to be respectively stored in different data pools. Moreover, after the link is restored, data that is stored when the link is interrupted can be rapidly updated in the other of the two data pools through high-speed data transmission.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A data storage system, configured to be connected to at least one client, the data storage system comprising:
a first server comprising a processor and memory, connected to a transmission line, the first server comprising:
a first data pool; and
a first controller, configured to operate in an active mode and an alone mode, wherein in the active mode, the first controller receives multiple pieces of to-be-stored data from the at least one client, and the first controller stores the pieces of to-be-stored data in the first data pool, and sends the pieces of to-be-stored data through the transmission line; and
a second server comprising a processor and memory, connected to the transmission line, wherein the second server is connected to the first server through the transmission line, and the second server comprises:
a second data pool; and
a second controller, configured to operate in the active mode and a rejection mode, wherein in the active mode, the second controller receives the pieces of to-be-stored data through the transmission line, and the second controller stores the pieces of to-be-stored data in the second data pool;
wherein when the second controller operates in the active mode, the second controller receives other pieces of to-be-stored data from the at least one client, and the second controller stores the other pieces of to-be-stored data in the second data pool, and sends the other pieces of to-be-stored data through the transmission line; and when the first controller operates in the active mode, the first controller receives the other pieces of to-be-stored data through the transmission line, and stores the other pieces of to-be-stored data in the first data pool;
wherein in the rejection mode, the second controller does not receive each piece of to-be-stored data sent by the at least one client, so that the first controller receives each piece of to-be-stored data in the alone mode, stores each piece of to-be-stored data in the first data pool, and the first controller does not send each piece of to-be-stored data through the transmission line.

2. The data storage system according to claim 1, wherein after the first controller is switched from the alone mode to the active mode, the first controller sends, through the transmission line, each piece of to-be-stored data stored in the first data pool in the alone mode, so that the second controller stores each piece of to-be-stored data in the second data pool in the rejection mode, and after each piece of to-be-stored data is stored in the second data pool, the second controller is switched from the rejection mode to the active mode.

3. The data storage system according to claim 2, wherein the first server is further connected to the second server through another transmission line, and the first controller and the second controller communicate with each other through the another transmission line, so as to detect whether the transmission line is interrupted and whether the second data pool is damaged.

4. The data storage system according to claim 3, wherein when the first controller and the second controller operate in the active mode and a link of the transmission line is interrupted, links of the transmission line and the another transmission line are interrupted or the second data pool is damaged, the first controller is switched from the active mode to the alone mode, and the second controller is switched from the active mode to the rejection mode.

5. The data storage system according to claim 4, further comprising at least one rescue module disposed in each client, wherein each rescue module generates a first mode switching signal and a second mode switching signal according to first health information of the first data pool sent by the first server and second health information of the second data pool sent by the second server; and when the links of the transmission line and the another transmission line are interrupted, the first controller performs mode switching according to the first mode switching signal, and the second controller performs mode switching according to the second mode switching signal.

6. The data storage system according to claim 5, wherein each rescue module compares the first health information and the second health information to generate the first mode switching signal and the second mode switching signal; when the links of the transmission line and the another transmission line are interrupted and the first health information is better than the second health information, the first controller is switched from the active mode to the alone mode according to the first mode switching signal, and the second controller is switched from the active mode to the rejection mode according to the second mode switching signal; and when the links of the transmission line and the another transmission line are interrupted and the second health information is better than the first health information, the first controller is switched from the active mode to the rejection mode according to the first mode switching signal, and the second controller is switched from the active mode to the alone mode according to the second mode switching signal.

7. The data storage system according to claim 4, further comprising at least one rescue module disposed in each client, wherein the second server is in a powered-off state, so that the first controller does not receive a mode switching signal from the at least one rescue module within a preset waiting time and is switched from the active mode to the alone mode.

8. The data storage system according to claim 1, wherein at least one piece of to-be-stored data of the pieces of to-be-stored data is divided into multiple data segments, the data segments are respectively stored in the first data pool and the second data pool, the first controller repeatedly captures a snapshot of the first data pool before the at least one piece of to-be-stored data is respectively divided into the data segments, and the second controller repeatedly captures a snapshot of the second data pool before the at least one piece of to-be-stored data is respectively divided into the data segments.

9. The data storage system according to claim 1, wherein one piece of to-be-stored data of the pieces of to-be-stored data is divided into multiple data segments after the transmission line and another transmission line are both interrupted, the first server further comprises a first register, the second server further comprises a second register, the first controller stores a first data segment of the data segments and a sequence number corresponding to the first data segment in the first register, the first controller records a first status of the first register at a time point, the first status comprises the first data segment and the sequence number, the second controller stores a second data segment of the data segments and another sequence number corresponding to the second data segment in the second register, the second controller records a second status of the second register at the time point, and the second status comprises the second data segment and the another sequence number.

10. The data storage system according to claim 9, wherein the first controller captures a first snapshot of the first data pool after the to-be-stored data is divided into the data segments, the second controller captures a second snapshot of the second data pool after the to-be-stored data is divided into the data segments, the first controller and the second controller combine the first data segment having the sequence number and the second data segment having the another sequence number according to the first status and the second status, and the first controller and the second controller store, in the first data pool and the second data pool according to the first snapshot and the second snapshot, the first data segment and the second data segment obtained after combination.

11. The data storage system according to claim 1, wherein the transmission line is a high-speed data transmission line.

12. A data storage method, comprising:
receiving multiple pieces of to-be-stored data from at least one client by using a first controller of a first server operating in an active mode;
storing the pieces of to-be-stored data in a first data pool of the first server by using the first controller operating in the active mode;
transferring the pieces of to-be-stored data from the first server to a second server through a transmission line by using the first controller operating in the active mode; and storing the pieces of to-be-stored data in a second data pool of the second server through a second controller of the second server operating in the active mode;
receiving other pieces of to-be-stored data from the at least one client by using the second controller operating in the active mode;
storing the other pieces of to-be-stored data in the second data pool by using the second controller operating in the active mode;
transferring the other pieces of to-be-stored data from the second server to the first server through the transmission line by using the second controller operating in the active mode;
storing the other pieces of to-be-stored data in the first data pool through the first controller operating in the active mode;
receiving each piece of to-be-stored data sent by the at least one client by using the first controller operating in an alone mode and do not receive each piece of to-be-stored data sent by the at least one client by using the second controller operating in a rejection mode; and
storing each piece of to-be-stored data in the first data pool and do not send each piece of the to-be-stored data through the transmission line by using the first controller operation in the alone mode.

13. The data storage method according to claim 12, further comprising:
detecting, through another transmission line, whether a link of the transmission line is interrupted, wherein the another transmission line is connected to the first server and the second server; and
when the link of the transmission line is interrupted, during a period in which the link of the transmission line is interrupted, storing other pieces of to-be-stored data from the at least one client in either of the first data pool and the second data pool.

14. The data storage method according to claim 13, after the link of the transmission line is interrupted, the data storage method further comprises: after the link of the transmission line is restored, synchronizing the other pieces of to-be-stored data to the other of the first data pool and the second data pool through the transmission line during the period in which the link of the transmission line is interrupted.

15. The data storage method according to claim 12, further comprising:
detecting, through another transmission line, whether the first data pool or the second data pool is damaged or a link is interrupted, wherein the another transmission line is connected to the first server and the second server; and
when either of the first data pool and the second data pool is damaged or the link is interrupted, during a period in which either of the first data pool and the second data pool is damaged or the link is interrupted, storing other pieces of to-be-stored data from the at least one client in the other of the first data pool and the second data pool.

16. The data storage method according to claim 15, after either of the first data pool and the second data pool is damaged or the link is interrupted, the data storage method further comprises: after either of the first data pool and the second data pool is repaired or the link is restored, synchronizing the other pieces of to-be-stored data to the other of the first data pool and the second data pool through the transmission line.

17. The data storage method according to claim 13, further comprising:
   detecting whether links of the two transmission lines are interrupted; and
   when the links of the two transmission lines are both interrupted, controlling, by using at least one rescue module disposed in the at least one client according to first health information from the first server and second health information from the second server, the first server and the second server to store still other pieces of to-be-stored data from the at least one client in either of the first server and the second server during a period in which the links of the two transmission lines are both interrupted.

18. The data storage method according to claim 13, further comprising:
   detecting whether links of the two transmission lines are interrupted; and
   when the links of the two transmission lines are both interrupted, during a period in which the links of the two transmission lines are both interrupted, after a preset waiting time, storing still other pieces of to-be-stored data from the at least one client in one of the first server and the second server.

19. The data storage method according to claim 18, wherein after the step in which the links of the two transmission lines are both interrupted, the data storage method further comprises: after the links of the two transmission lines are both restored, synchronizing, in the other of the first server and the second server through the transmission line, the still other pieces of to-be-stored data stored during a period in which the two transmission lines are interrupted.

20. The data storage method according to claim 12, further comprising:
   when one piece of to-be-stored data of the pieces of to-be-stored data is divided into multiple data segment and a first data segment and a second data segment of the data segments are respectively stored in the first data pool and the second data pool, capturing a first snapshot of the first data pool, and capturing a second snapshot of the second data pool; and
   when the to-be-stored data of the pieces of to-be-stored data is divided into the data segments, storing the first data segment and a sequence number corresponding to the first data segment in a first register of the first server, and storing the second data segment and another sequence number corresponding to the second data segment in a second register of the second server.

21. The data storage method according to claim 20, further comprising:
   at a time point after the to-be-stored data of the pieces of to-be-stored data is divided into the data segments, recording a first status of the first register, wherein the first status comprises the first data segment and the sequence number;
   recording a second status of the second register at the time point, wherein the second status comprises the second data segment and the another sequence number; and
   combining the first data segment and the second data segment according to the first snapshot, the second snapshot, the first status, and the second status to establish data restoration points of the first data pool and the second data pool at the time point.

22. A data storage system, configured to be connected to at least one client, the data storage system comprising:
   a first server comprising a processor and memory, connected to a transmission line, the first server comprising:
   a first data pool; and
   a first controller, configured to operate in an active mode, wherein in the active mode, the first controller receives multiple pieces of to-be-stored data from the at least one client, and the first controller stores the pieces of to-be-stored data in the first data pool, and sends the pieces of to-be-stored data through the transmission line; and
   a second server comprising a processor and memory, connected to the transmission line, wherein the second server is connected to the first server through the transmission line, and the second server comprises:
   a second data pool; and
   a second controller, configured to operate in the active mode, wherein in the active mode, the second controller receives the pieces of to-be-stored data through the transmission line, and the second controller stores the pieces of to-be-stored data in the second data pool;
   wherein at least one piece of to-be-stored data of the pieces of to-be-stored data is divided into multiple data segments, the data segments are respectively stored in the first data pool and the second data pool, the first controller repeatedly captures a snapshot of the first data pool before the at least one piece of to-be-stored data is respectively divided into the data segments, and the second controller repeatedly captures a snapshot of the second data pool before the at least one piece of to-be-stored data is respectively divided into the data segments.

23. A data storage system, configured to be connected to at least one client, the data storage system comprising:
   a first server comprising a processor and memory, connected to a transmission line, the first server comprising:
   a first data pool; and
   a first controller, configured to operate in an active mode, wherein in the active mode, the first controller receives multiple pieces of to-be-stored data from the at least one client, and the first controller stores the pieces of to-be-stored data in the first data pool, and sends the pieces of to-be-stored data through the transmission line; and
   a second server comprising a processor and memory, connected to the transmission line, wherein the second server is connected to the first server through the transmission line, and the second server comprises:
   a second data pool; and
   a second controller, configured to operate in the active mode, wherein in the active mode, the second controller receives the pieces of to-be-stored data through the transmission line, and the second controller stores the pieces of to-be-stored data in the second data pool;
   wherein one piece of to-be-stored data of the pieces of to-be-stored data is divided into multiple data segments after the transmission line and another transmission line are both interrupted, the first server further comprises a first register, the second server further comprises a second register, the first controller stores a first data segment of the data segments and a sequence number corresponding to the first data segment in the first register, the first controller records a first status of the first register at a time point, the first status comprises the first data segment and the sequence number, the second controller stores a second data segment of the data segments and another sequence number corresponding to the second data segment in the second register, the second controller records a second status of the second register at the time point, and the second status comprises the second data segment and the another sequence number.

24. The data storage system according to claim 23, wherein the first controller captures a first snapshot of the first data pool after the to-be-stored data is divided into the data segments, the second controller captures a second snapshot of the second data pool after the to-be-stored data is divided into the data segments, the first controller and the second controller combine the first data segment having the sequence number and the second data segment having the another sequence number according to the first status and the second status, and the first controller and the second controller store, in the first data pool and the second data pool according to the first snapshot and the second snapshot, the first data segment and the second data segment obtained after combination.

25. A data storage method, comprising:
receiving multiple pieces of to-be-stored data from at least one client by using a first controller of a first server;
storing the pieces of to-be-stored data in a first data pool of the first server;
transferring the pieces of to-be-stored data from the first server to a second server through a transmission line;
storing the pieces of to-be-stored data in a second data pool of the second server through a second controller of the second server;
detecting, through another transmission line, whether a link of the transmission line is interrupted, wherein the another transmission line is connected to the first server and the second server; and
when the link of the transmission line is interrupted, during a period in which the link of the transmission line is interrupted, storing other pieces of to-be-stored data from the at least one client in either of the first data pool and the second data pool;
detecting whether links of the two transmission lines are interrupted; and
when the links of the two transmission lines are both interrupted, controlling, by using at least one rescue module disposed in the at least one client according to first health information from the first server and second health information from the second server, the first server and the second server to store still other pieces of to-be-stored data from the at least one client in either of the first server and the second server during a period in which the links of the two transmission lines are both interrupted.

26. A data storage method, comprising:
receiving multiple pieces of to-be-stored data from at least one client by using a first controller of a first server;
storing the pieces of to-be-stored data in a first data pool of the first server;
transferring the pieces of to-be-stored data from the first server to a second server through a transmission line;
storing the pieces of to-be-stored data in a second data pool of the second server through a second controller of the second server;
when one piece of to-be-stored data of the pieces of to-be-stored data is divided into multiple data segment and a first data segment and a second data segment of the data segments are respectively stored in the first data pool and the second data pool, capturing a first snapshot of the first data pool, and capturing a second snapshot of the second data pool; and
when the to-be-stored data of the pieces of to-be-stored data is divided into the data segments, storing the first data segment and a sequence number corresponding to the first data segment in a first register of the first server, and storing the second data segment and another sequence number corresponding to the second data segment in a second register of the second server.

27. The data storage method according to claim 26, further comprising:
at a time point after the to-be-stored data of the pieces of to-be-stored data is divided into the data segments, recording a first status of the first register, wherein the first status comprises the first data segment and the sequence number;
recording a second status of the second register at the time point, wherein the second status comprises the second data segment and the another sequence number; and
combining the first data segment and the second data segment according to the first snapshot, the second snapshot, the first status, and the second status to establish data restoration points of the first data pool and the second data pool at the time point.

* * * * *